(12) United States Patent
Benton et al.

(10) Patent No.: US 10,474,432 B2
(45) Date of Patent: Nov. 12, 2019

(54) REPEATABLE DISTRIBUTED PSEUDORANDOM NUMBER GENERATION

(71) Applicant: Red Hat, Inc., Raleigh, NC (US)

(72) Inventors: William Christian Benton, Madison, WI (US); Erik Jordan Erlandson, Phoenix, AZ (US)

(73) Assignee: RED HAT, INC., Raleigh, NC (US)

( * ) Notice: Subject to any disclaimer, the term of this patent is extended or adjusted under 35 U.S.C. 154(b) by 55 days.

(21) Appl. No.: 15/801,502

(22) Filed: Nov. 2, 2017

(65) Prior Publication Data
US 2019/0129694 A1 May 2, 2019

(51) Int. Cl.
*G06F 7/58* (2006.01)
(52) U.S. Cl.
CPC .................... *G06F 7/582* (2013.01)
(58) Field of Classification Search
CPC .......................................................... G06F 7/582
USPC ........................................................ 708/254
See application file for complete search history.

(56) References Cited

U.S. PATENT DOCUMENTS

| 6,392,829 | B1 * | 5/2002 | Stoutenburgh ..... G11B 20/1833 360/39 |
| 6,889,221 | B1 | 5/2005 | Luo et al. |
| 8,244,786 | B2 * | 8/2012 | Fischer ..................... G06F 7/58 708/254 |
| 8,694,467 | B2 | 4/2014 | Sun |
| 9,128,791 | B1 | 9/2015 | Boppana |
| 9,306,876 | B1 * | 4/2016 | Ulman ..................... H04L 49/90 |
| 2002/0046359 | A1 | 4/2002 | Boden |
| 2004/0162864 | A1 | 8/2004 | Nowshadi et al. |
| 2006/0224647 | A1 * | 10/2006 | Gutnik ..................... G06F 7/582 708/250 |
| 2011/0106855 | A1 | 5/2011 | Resch et al. |

OTHER PUBLICATIONS

Thomas, et al; "A Comparison of CPUs, GPUs, FPGAs, and Massively Parallel Processor Arrays for Random Number Generation"; 2009; (10 pages).

* cited by examiner

*Primary Examiner* — Tan V Mai
(74) *Attorney, Agent, or Firm* — K&L Gates LLP

(57) ABSTRACT

Repeatable distributed pseudorandom number generation is disclosed. For example, a system has a plurality of pseudorandom number generators ("PRNGs") including a first and second PRNGs and a randomization engine including a seed engine configured to control the plurality of PRNGs by executing to generate a plurality of seed values equal in quantity to the plurality of PRNGs, including first and second seed values. The first seed value is assigned to the first PRNG and the second seed value to the second PRNG. A first pseudorandom number ("PRN") set is received from the first PRNG and a second PRN set from the second PRNG. A plurality of PRN sets from the plurality of PRNGs is combined into a combined number set.

20 Claims, 9 Drawing Sheets

REPEATABLE DISTRIBUTED PSEUDORANDOM NUMBER GENERATION

BACKGROUND

The present disclosure generally relates to distributed processing in computing devices. Computer systems may typically be configured to employ multiple processors that may process data in parallel. An application configured to execute multiple tasks in parallel may complete the execution of a set of tasks faster than an application executing the same set of tasks sequentially. Many computing tasks may typically require a random input value, but for most computing tasks, true randomness is not necessary and therefore pseudorandom numbers ("PRNs") generated by pseudorandom number generators ("PRNGs") are typically used as inputs to simulate randomness. Typically, a differentiator between a sequence of truly random numbers and a sequence of PRNs is that the sequence of PRNs may be reliably regenerated based on a given input seed. To adequately simulate randomness, typically, a method of PRN generation may be selected where for a given input seed, the nth PRN generated may not be predicted without generating each intervening PRN in sequence.

SUMMARY

The present disclosure provides a new and innovative system, methods and apparatus for repeatable distributed pseudorandom number generation. In an example, a system has a plurality of pseudorandom number generators ("PRNGs") including a first and second PRNGs and a randomization engine including a seed engine configured to control the plurality of PRNGs by executing to generate a plurality of seed values equal in quantity to the plurality of PRNGs, including first and second seed values. The first seed value is assigned to the first PRNG and the second seed value to the second PRNG. A first PRN set is received from the first PRNG and a second PRN set from the second PRNG. A plurality of PRN sets from the plurality of PRNGs is combined into a combined number set.

Additional features and advantages of the disclosed method and apparatus are described in, and will be apparent from, the following Detailed Description and the Figures.

DETAILED DESCRIPTION OF EXAMPLE EMBODIMENTS

Figure 1:
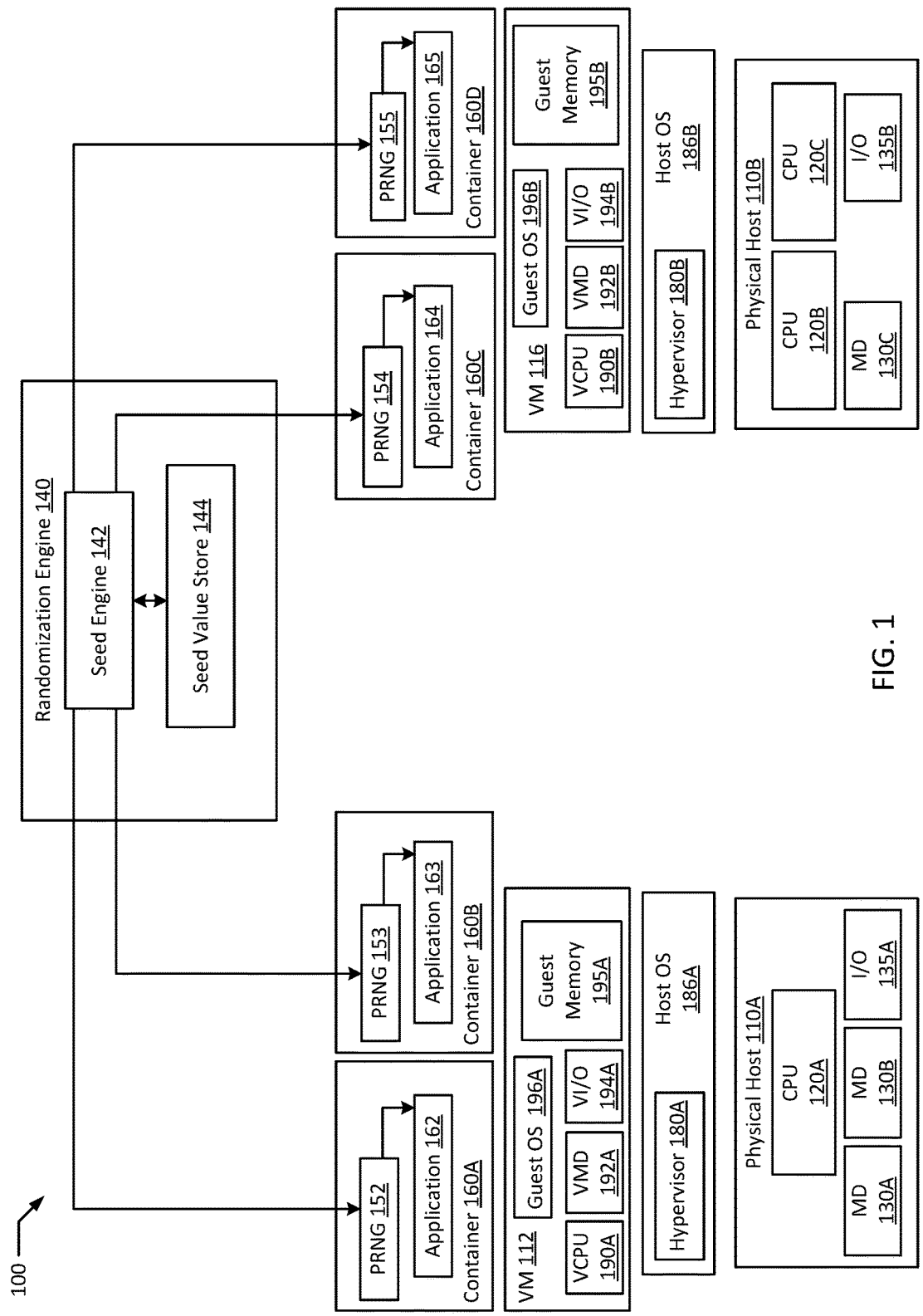
FIG. 1 is a block diagram of a repeatable distributed pseudorandom number generation system according to an example of the present disclosure.

Many typical computing tasks rely on a source of randomness as an input. For example, computers are often used for scientific simulations based on statistical theory, where an assumption and/or test case of the simulation may typically include an element of randomness matching a certain statistical distribution. Fluid and gaseous dynamics, radioactive decay, quantum mechanics, and many other scientific areas of study rely on randomness as an inherent quality of the studied subject matter. Many other fields rely on statistical models to estimate a population wide result based on a statistically significant sample. For example, the bootstrap method, Monte Carlo simulations, and K-means clustering simulation techniques are used in constructing economic models, clinical trials for drugs, studying population dynamics, etc.

Sources of randomness may be based on physical events and manipulations, for example, rolling dice, flipping coins, spinning roulette wheels, etc. Computer hardware may be leveraged as a source of randomness (e.g., clock drift, radio noise, hard disk movement timing, radioactive decay, thermal sensors, audio sensors, etc.) Hardware random number generation techniques are typically truly random (e.g., the results are not reproducible). In certain scenarios, true randomness is advantageous, but physical events generating the randomness may necessitate additional computation for generating random numbers matching a specific distribution. For example, rolling two dice allows the generation of 11 possible outcomes, the values 2-12. However, while there are six ways the dice can land to yield a 7 (e.g., 1-6, 2-5, 3-4, 4-3, 5-2, 6-1), there is only one way to get 2 (e.g., 1-1) and one way to get 12 (e.g., 6-6). Therefore the distribution of random values is not a uniform distribution from a two dice based random number generator, and dice results would require additional manipulation to generate a uniform distribution if such a distribution is desired. In a typical computer system, random variability in a processor or a storage disk may be a primary source of randomness for a hardware random number generator.

Historically, hardware random number generators were disfavored in part due to being unable to test them for true randomness. Before computer storage became abundant, storing a statistically significant sample of random numbers generated by, for example, clock drift may have been impractical, therefore making it difficult to determine whether a particular source of randomness was truly random, or if there was some sort of pattern to the sample set. For example, certain physical movements may have a periodic nature that would have been difficult to observe if large sample sets are not recorded. Also, in such early systems, hardware generation of random numbers into a recorded medium (e.g., punch cards) and then playback from the storage medium was significantly slower than computational generation through mathematical models on demand. Many computing pioneers therefore resorted to implementing pseudorandom number generators whose deficiencies could be calculated. For example, John von Neumann implemented the middle-square method of PRNG. In a middle-square method, a seed with the same number of digits as the desired random number may be chosen and squared. The middle digits of the squared number is then the generated PRN, and also the seed for the next PRN. For example, a seed of "1111" yields "2343" ($1111^2$=01234321, drop the first 2 and last 2 digits), which then yields "4896", etc. In the early days of computing in the mid-twentieth century, the computers of the day could generate middle-square values 100 times faster than reading random numbers stored to punch cards, so the performance advantages outweighed the lack of true randomness. In addition, one benefit of the middle-square method was that seeds that generated short sequences of numbers before repeating (e.g., "0000" as a seed would always generate "0000") would be easily detectable. A commonly deployed PRNG in programming languages commonly used in statistical modeling (e.g., MATLAB®, Mathematica®, Python®, Ruby, R, SageMath, Scilab®, Stata®, C++, etc.) applications is the Mersenne Twister which typically employs a formula that does not form predictable patterns for a period of $2^{19937}-1$ iterations ($\approx 4.3 \times 10^{6001}$ iterations) of PRNs. Generating $10^8$ 32-bit pseudorandom integers with the Mersenne Twister typically takes well under 1 second, and optimizations are available to speed up generation by 2 or 3 fold. In a typical computer system, an operating system of the computer system (e.g., Red Hat Enterprise Linux®) may be configured, as necessary, to support code written in many different programming languages and PRNGs implemented in a variety of ways.

An additional feature of PRNGs is that for a given seed, the number sequence generated will always be the same. In many applications, potential predictability and reproducibility is a disadvantage (e.g., lotteries, gambling applications, random sampling, encryption keys, etc.). Creating a predictable lottery or gambling game would likely cause a scandal. However, in other applications, being able to "control" for randomness is highly advantageous. For example, in a scientific simulation employing randomness (e.g., a simulation for molecular motion or fluid dynamics), changes in randomness between two runs of the simulation may skew results by more than a change in a variable actually being tested. Therefore, provided that an original source of randomness is sufficiently random for the test being conducted, subsequent runs of the simulation may be more accurate at testing hypothesis if the source of randomness is controlled.

A common simulation for approximating results of large sample sets employs the Monte Carlo method (e.g., a Monte Carlo simulation). The method computes a statistically significant number of possible results based on various variable inputs, and the resulting distribution is therefore a weighted distribution of results of varying probabilities. For example, the value of π may be approximated by drawing a circle inside of a square and generating a large quantity of random coordinates within the square. The ratio of the number of coordinates within the circle to the total number of coordinates may be used to find an approximation for π/4, which as an irrational number, cannot be exactly computed. Typically, the more samples (e.g., coordinates) taken, the closer the approximation will be. Monte Carlo simulations with many inputs may be used to simulate and approximate solutions in many fields where a plurality of experimental inputs are probabilistic ranges rather than exact values. For example, Monte Carlo simulations are typically implemented to solve a variety of problems in physics, engineering, climate change, meteorology, computational biology, computer graphics rendering, applied statistics, artificial intelligence, and financial risk calculations. To test a change in results from changing a variable in a Monte Carlo simulation, the simulation may be rerun with the same set of random numbers, or in the case of a PRNG, rerun with the same seed in the PRNG.

PRNGs used in simulations typically have requirements as to the statistical randomness of the PRNs generated. In an example, results of a simulation may not be valid if the PRNG is too predictable. Therefore, most PRNGs employed in modern computer simulations are designed such that, while a sequence of generated PRNs are repeatable by using the same seed, it is typically difficult and/or impossible to predict or seek the nth value in the sequence of PRNs generated by a given seed by a PRNG considered statistically reliable without sequentially generating each value from the first to the n–1th. Typically, seekability is incompatible with statistical randomness. Due to the limitation of sequential PRN generation imposed by "reliable" PRNGs, simulations that require repeatability may also be limited to being run sequentially. A sequential processing limitation in the generation of PRNs may not be a significant issue by itself since PRNGs typically execute very quickly, however, when a generated PRN is an input into an application that would otherwise support distributed processing, being limited by the sequential execution of the PRNG (e.g., to maintain repeatability of the test) may significantly degrade the performance of the application. To improve performance, such as where repetitive processing of many similar inputs is required for a following step in the computational process, distributing the load of the repetitive processing to many different processors and then recombining the processed inputs into a combined data set may significantly reduce or eliminate a processing bottleneck resulting from the repetitive processing. For example, similar manipulations may be performed on millions of data points in a big data datamining system. In systems (e.g., big data) where a large data set is divided into many smaller pieces or shards to be processed by different instances of the application, potentially on different hosts, repeatability and/or resiliency to failure by a given instance of the application may be lost by executing the different instances of the application with different PRNGs (e.g., to avoid sequential processing limitations).

The present disclosure aims to address sequential limitations of PRNGs. In a typical example, multiple instances of the same PRNG may be deployed. In the example, a given application or service that requires PRN input may be distributed to a plurality of nodes in the system. Typically at least one instance of the PRNG may be deployed in conjunction with each separate application instance requiring PRN input. In the example, a seed engine may be a different PRNG or hardware RNG that generates and records seeds for each instance of the PRNG. Each PRN generated by each PRNG is then derived from the recorded seeds from the seed engine, and the outputs of each PRNG may then be recombined into a combined number set from all of the PRNGs. In an example, the combined number set may be fed into the application as a pre-generated whole. In another example, the combined number set may be generated after the execution of the application. For example, where multiple instances of the application execute independently, each on a portion of the total data input set, the individual PRNGs associated with each instance of the application may generate PRNs on demand until the individual instance of the application has completed processing its portion of the data input. Therefore, the data input need not be split into equal parts since each instance of the PRNG may dynamically generate more or less PRNs. Each of these PRNs may be recorded and recombined as a combined number set, and each PRNG-application instance group may be individually re-executed as long as the seed for the PRNG and the input data are preserved. In an example, a container executing a PRNG and an application instance may crash, but the lost results may be replicated by the same container, a replacement container or another container with another instance of the application and PRNG without resorting to a different set of PRNs from the original failed run. In an example, for generating a very large set of PRNs, distributing generation to multiple PRNG instances while maintaining repeatability may increase generation speed by a factor approaching the number of instances of PRNG used.

FIG. 1 is a block diagram of a repeatable distributed pseudorandom number generation system according to an example of the present disclosure. The system 100 may include one or more physical hosts 110A-B. Each physical host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each physical host 110A-B, including the connections between a processor 120A and a memory device 130A-B and between a processor 120A and an I/O device 135A may be provided by one or more local buses of suitable architecture, for example, peripheral component interconnect (PCI).

In an example, physical hosts 110A-B may run one or more isolated guests, for example, VMs 112 and 116, containers 160A-D. In an example, any of containers 160A-D may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, VMs 112 and 116 may be VMs executing on physical hosts 110A-B. In an example, containers 160A-B may execute on VM 112 while containers 160C-D may execute on VM 116. In an example, randomization engine 140, including seed engine 142 and seed value store 144 may execute either independently or within a container. In an example, seed engine 142 and/or seed value store 144 may execute on a separate host (e.g., a separate container, VM, or physical host) from randomization engine 140. In an example, any of containers 160A-D may be executing directly on either of hosts 110A-B without a virtualized layer in between. In an example, isolated guests may be further nested in other isolated guests. For example, VMs 112 and 116 may host containers (e.g., containers 160A-D). In addition, containers and/or VMs may further host other guests necessary to execute their configured roles. For example, a VM (e.g., VM 112 or 116) and/or a container (e.g., containers 160A-D) may further host a Java® Virtual Machine ("JVM") if execution of Java® code is necessary.

System 100 may run one or more VMs (e.g., VMs 112 and 116), by executing a software layer (e.g., hypervisor 180A-B) above the hardware and below the VMs 112 and 116, as schematically shown in FIG. 1. In an example, the hypervisors 180A-B may be components of respective host operating systems 186A-B executed by the system 100. In another example, the hypervisors 180A-B may be provided by an application running on respective operating systems 186A-B, or may run directly on respective physical hosts 110A-B without an operating system beneath them. Hypervisor 180A-B may virtualize the physical layer, including processors, memory, and I/O devices, and present this virtualization to VMs 112 and 116 as devices, including virtual central processing units ("VCPUs") 190A-B, virtual memory devices ("VMDs") 192A-B, virtual input/output ("VI/O") devices 194A-B, and/or guest memories 195A-B. In an example, a container may execute directly on host OSs 186A-B without an intervening layer of virtualization.

In an example, a VM 112 may be a virtual machine and may execute a guest operating system 196A which may utilize the underlying VCPU 190A, VMD 192A, and VI/O 194A. One or more isolated guests (e.g., containers 160A-B) may be running on VM 112 under the respective guest operating system 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, containers 160A-B running on VM 112 may be dependent on the underlying hardware and/or host operating system 186A. In another example, containers 160A-B running on VM 112 may be independent of the underlying hardware and/or host operating system 186. In an example, containers 160A-B running on VM 112 may be compatible with the underlying hardware and/or host operating system 186A. Additionally, containers 160A-B running on VM 112 may be incompatible with the underlying hardware and/or OS. The hypervisor 180A may manage memory for the host operating system 186A as well as memory allocated to the VM 112 and guest operating system 196A such as guest memory 195A provided to guest OS 196. In an example, VM 116 and its associated components guest OS 196B, VCPU 190B, VMD 192B, VI/O 194B, and guest memory 195B may perform similar corresponding roles to the components in VM 112. Similarly, hypervisor 180B and host OS 186B may function in similar roles as related to VM 116 as hypervisor 180A and host OS 186A do to VM 112. In an example, s containers 160C-D may execute on VM 116 or directly on physical host 110B. In an example, physical hosts 110A-B, VMs 112-116, and/or containers 160A-D may be connected by any form of suitable network for enabling communications between computing devices, for example, a public network (e.g., the Internet), a private network (e.g., a local area network (LAN) or wide area network (WAN)), or a combination thereof.

In the example, randomization engine 140 may manage the deployment and/or execution of a plurality of PRNGs (e.g., PRNG 152-155). In an example, randomization engine 140 may be included as part of a service that may execute on distributed nodes (e.g., containers 160A-D) as distributed instances (e.g., applications 162-165). In an example, randomization engine 140 may be included as part of a container scheduler and/or orchestrator (e.g., Kubernetes®) that instantiates containers 160A-D. In an example, randomization engine 140, PRNGs 152-155, and/or applications 162-165 may be implemented via any form of executable code (e.g., executable file, script, application, service, daemon). In an example, applications 162-165 are instances of a same application. In the example, applications 162-165 may be configured to stream process data for simulations. In the example, PRNGs 152-155 may be configured to input PRNs into applications 162-165 respectively. In an example, PRNGs 152-155 may be any form of suitable PRNG (e.g., Blum Blum Shub, Blum-Micali, Complementary-multiply-with-carry, Counter-based random number generator (CBRNG), Inversive congruential generator, ISAAC (cipher), KISS PRNG, Lagged Fibonacci generator, Linear congruential generator, Linear feedback shift register, Maximal periodic reciprocals, Mersenne Twister, Middle-square method, MIXMAX generator, Multiply-with-carry, Naor-Reingold pseudorandom function, Park-Miller random number generator, PCG, RC4 PRGA, Rule 30, Well equidistributed long-period linear, Wichmann-Hill, Xorshift, Xoroshiro128+, Yarrow, etc.).

Figure 2A:
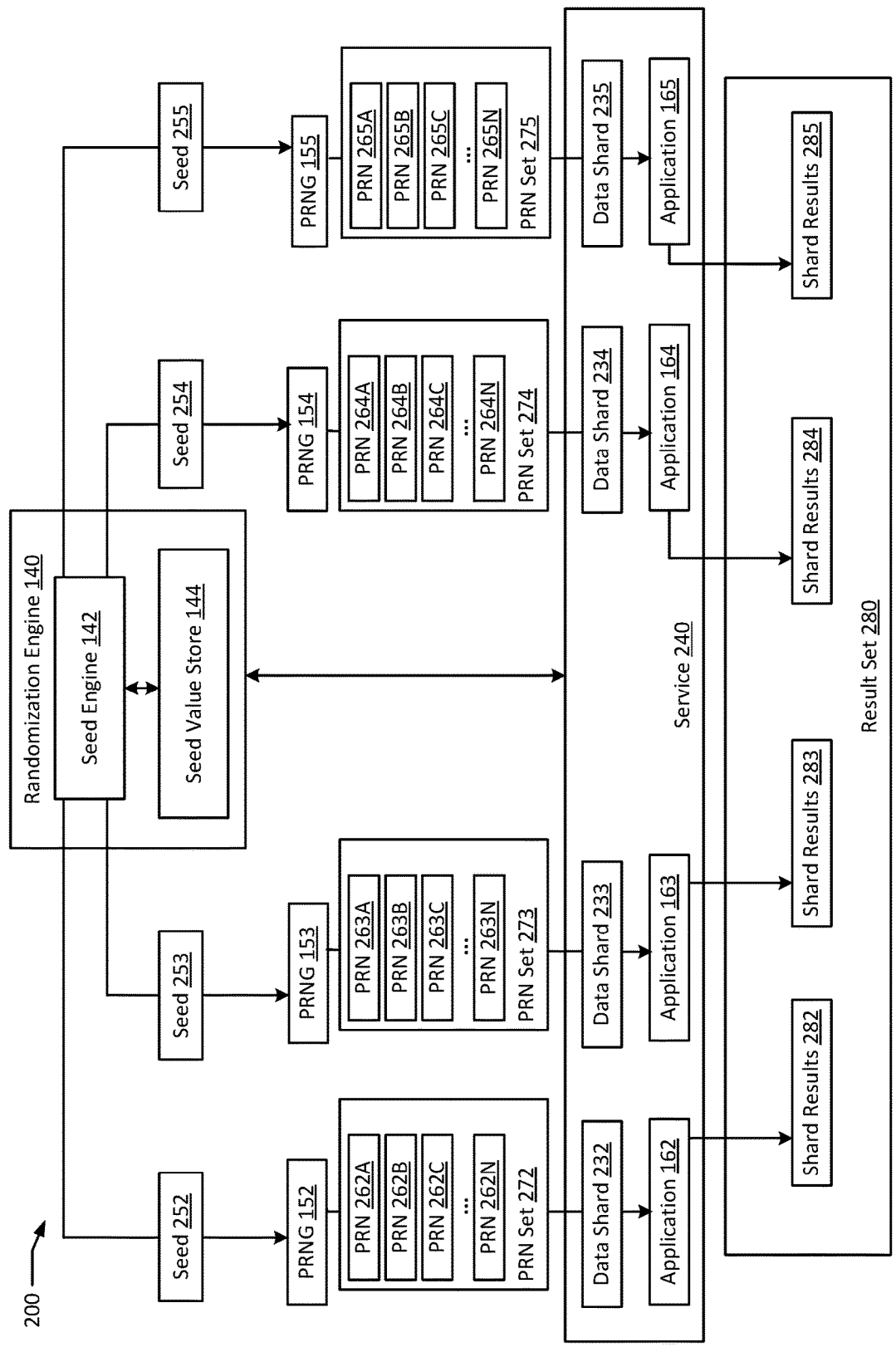
FIG. 2A is a block diagram illustrating a distributed application receiving inputs from a repeatable distributed pseudorandom number generation system according to an example of the present disclosure.

FIG. 2A is a block diagram illustrating a distributed application receiving inputs from a repeatable distributed pseudorandom number generation system according to an example of the present disclosure. In an example system 200, applications 162-165 are component parts of service 240. In the example, each of applications 162-165 is provided with a shard of a full data set to be processed (e.g., data shards 232-235). In the example, each of PRNGs 152-155 generates a PRN Set (e.g., PRN sets 272-275), each with a plurality of respective PRNs (e.g., PRN 262A-N in PRN set 272, PRN 263A-N in PRN set 273, PRN 264A-N in PRN set 274, and PRN 265A-N in PRN set 275). In an example, the quantity of PRNs in PRN sets 272-275 may be different, for example, PRN 262N may be the 14$^{th}$ PRN of PRN set 272 while PRN 263N may be the 8$^{th}$ PRN of PRN set 273. In an example, "N" may indicate any quantity of PRNs. In an example, each portion of data in each of data shards 232-235 processed by applications 162-165 additionally includes one or more of PRN 262A-N, PRN 263A-N, PRN 264A-N, or PRN 265A-N as input. In an example, results from applications 162-165 processing data shards 232-235 with PRN sets 272-275 are recorded as shard results 282-285 and combined into result set 280. In an example, service 240 may be a statistical modeling service (e.g., Monte Carlo simulation, K-means clustering simulation, etc.). In the example, the seeds 252-255 used to start PRNGs 152-155 may be stored and reused to rerun the simulation with different inputs. In an example, multiple sets of inputs may be simulated each several times with different random seeds 252-255, and each of the sets of random seeds may be tested against multiple simulation inputs. In another example, service 240 may be a procedural generation system, for example, to dynamically generate randomized encounters and locations in a video game. In the example, storing seeds 252-255 allows for regeneration of the same encounters and levels after saving a game file, and also allows technical support to recreate a specific user experience for testing and debugging. In an example, repeatable distributed PRN generation may be employed in testing computer hardware (e.g., processors, storage devices, etc.) by generating large volumes of simulated workload in the form of requests to use in simulating real usage. In an example, a test utility for a computer system may employ repeatable distributed PRN generation for workload stress testing to find workflow bottlenecks and inefficiencies. In an example, a network administrator may simulate a denial of service attack for testing network resiliency with repeatable distributed PRN generation to control the test case between tests with different configuration settings. In the example, isolating randomness induced variability may allow for more rapid discovery of the impacts of specific changes made to the test system.

Figure 2B:
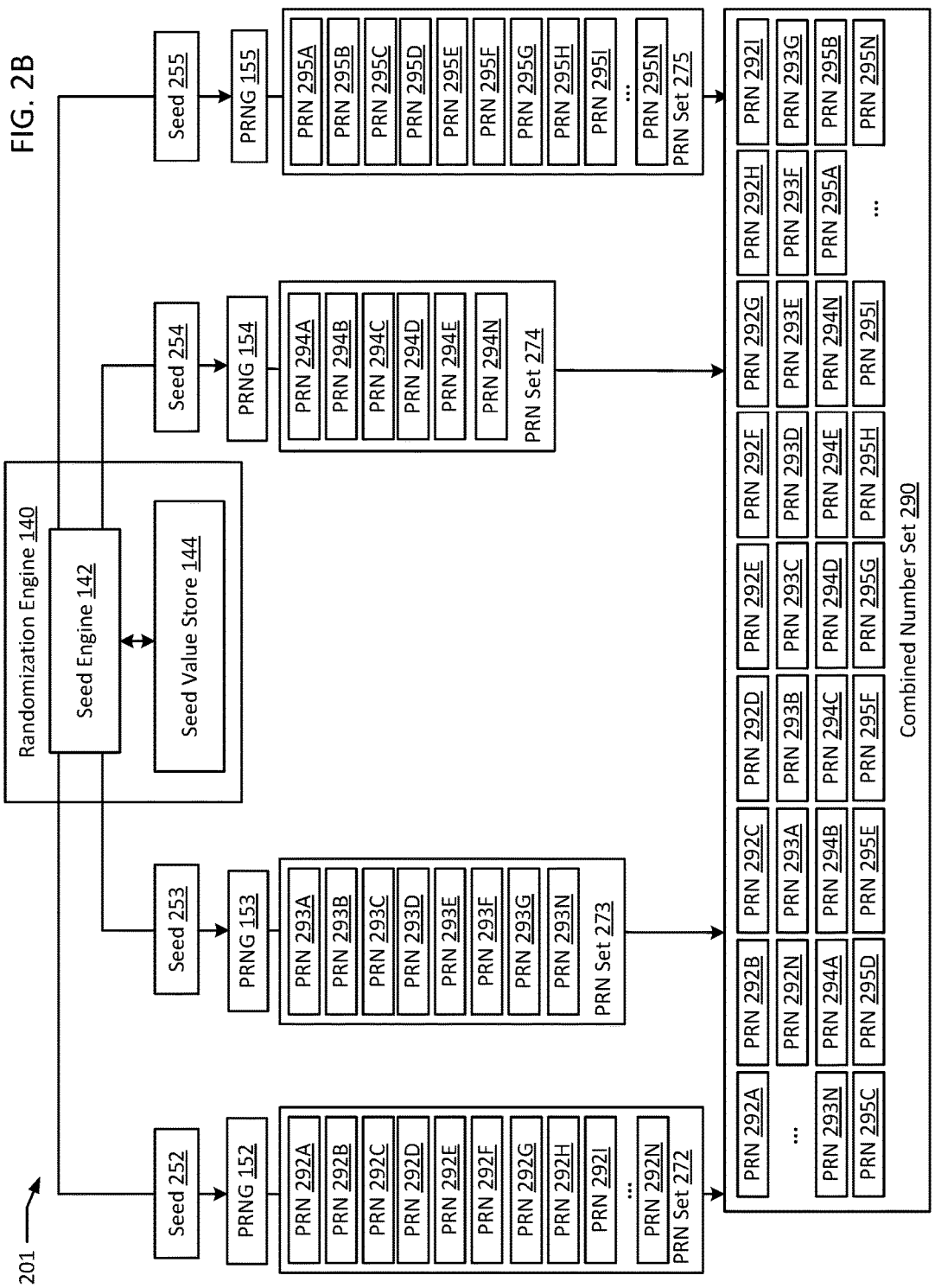
FIG. 2B is a block diagram illustrating a repeatable distributed pseudorandom number generation system generating a set of pseudorandom numbers in parallel according to an example of the present disclosure.

FIG. 2B is a block diagram illustrating a repeatable distributed pseudorandom number generation system generating a set of pseudorandom numbers in parallel according to an example of the present disclosure. Example system 201 may be a related system to system 200 or the same system as system 200. In the example, system 201 focuses on the generation of PRNs independent of any relationship between the generated PRNs and service 240. In an example, seeds 252-255 sent to PRNGs 152-155 generate PRN sets 272-275. In an example, PRN sets 272-275 may each be of the same quantity of PRNs (e.g., PRN 292A-N, 293A-N, 294A-N, and 295A-N). For example, a request may be to generate 56 PRNs, and each of PRNGs 152-155 generates 14 PRNs (e.g., PRN 292A-N, 293A-N, 294A-N, and 295A-N) which are then combined to form a combined number set 290. In another example, PRNGs 152-155 each generate PRNs on request by the associated application 162-165. In the example, PRN Set 272 may include 14 PRNs 292A-N, PRN set 273 may include 8 PRNs 293A-G and 293N, PRN set 274 may include 6 PRNs 294A-E and 294N, while PRN Set 275 may again include 14 PRNs 295A-N. In the example, combined number set 290 would therefore have 42 total PRNs (e.g., PRN 292A-N, 293A-G, 293N, 294 A-E, 294N, and 295A-N). In an example, PRN sets 273 and 274 may have less PRNs generated due to less partitions to process in data shards 233 and 234 vs. data shards 232 and 235. In an example, combined number set 290 may be recreated by being stored in persistent storage and replayed. In another example, seeds 252-255 may be stored in seed value store 144 and each of PRN sets 272-275 may be individually regenerated or generated together based on inputting a corresponding seed 252-255 into a PRNG 152-155. In an example, PRN set 273 may be regenerated by PRNG 152 if PRNG 152 is given seed 253. In an example, seed engine 142 may be a random number generator. In some examples seed engine 142 may be a hardware "true" RNG. In other examples, seed engine 142 may also be a PRNG. In an example, with a PRNG seed engine 142, seeds 252-255 may be regenerated based on a seed engine seed that is recorded. In an example, seed engine 142 may dynamically generate as many seeds as are required to provide seeds to each PRNG in a system (e.g., PRNGs 152-155). In an example, seed engine 142 may employ a different PRNG from PRNGs 152-155, for example to avoid having a PRN set 272 start repeating the values of the beginning of PRN set 273 if enough values are generated in PRN set 272. In another example, seeds 252-255 may be derived from outputs from seed engine 142 rather than being the direct outputs of seed engine 142, therefore reducing the likelihood of convergence between PRN sets 272-275 even if seed engine 142 implements the same PRNG as PRNGs 152-155.

Figure 3:
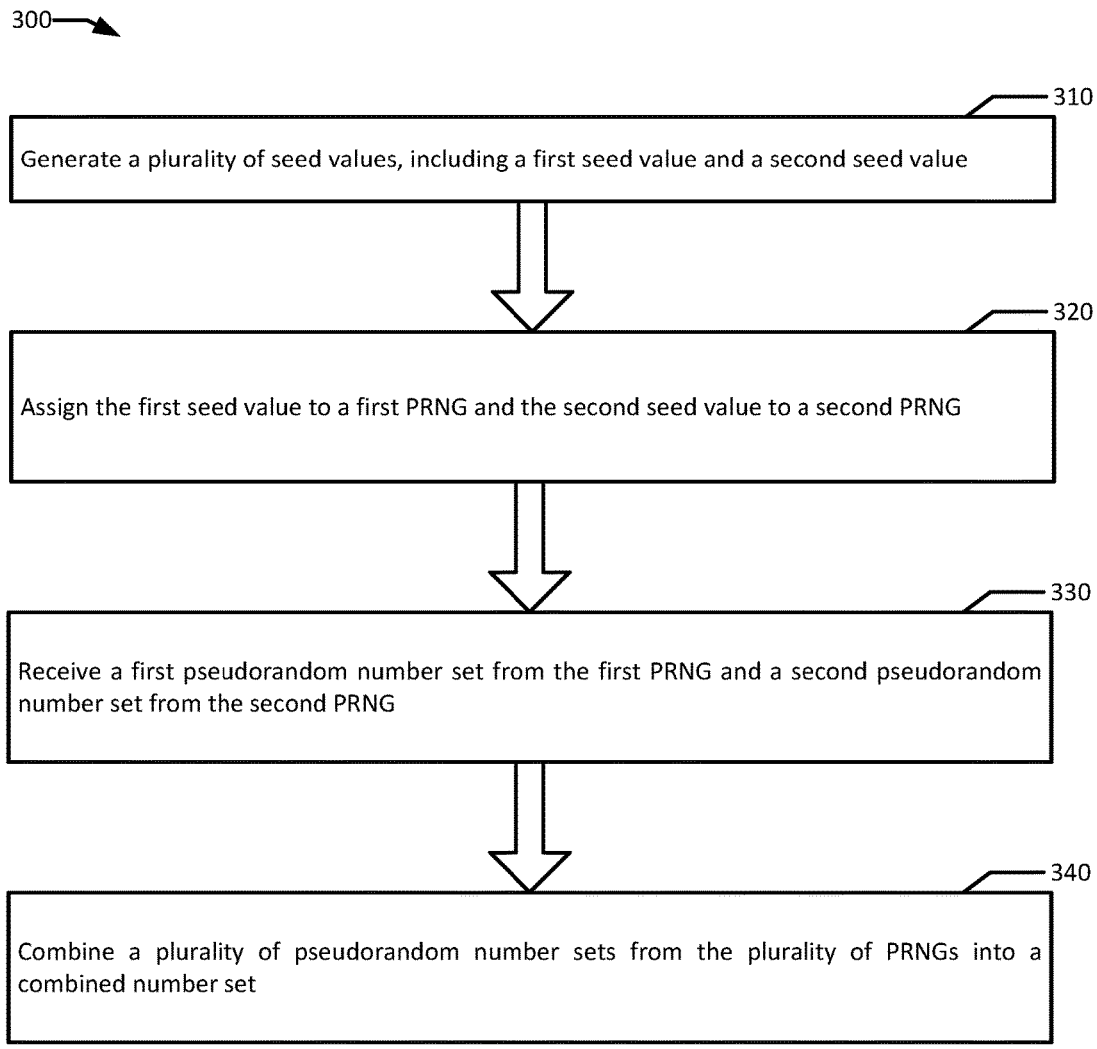
FIG. 3 is a flowchart illustrating an example of distributed pseudorandom number generation according to an example of the present disclosure.

FIG. 3 is a flowchart illustrating an example of distributed pseudorandom number generation according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a randomization engine 140.

Example method 300 may begin with generating a plurality of seed values, including a first seed value and a second seed value, wherein the plurality of seed values is equal in quantity to a plurality of PRNGs (block 310). In an example, seed engine 142 in randomization engine 140 generates seeds 252 and 253 for PRNGs 152 and 153. In an example, each of PRNGs 152-155 has a respective seed 252-255 generated. In an example, the plurality of seed values (e.g., seeds 252-255) is stored to persistent storage and a combined number set 290 may be reproduced by re-inputting the plurality of seed values (e.g., seeds 252-255) into the plurality of PRNGs (e.g., PRNGs 152-155). In an example, combined number set 290 is requested by service 240 capable of distributed execution (e.g., via applications 162-165) and the combined number set 290 is an input into service 240. In an example, service 240 is run repeatedly to test changes to an output of service 240 (e.g., result set 280) based on configurable variables of service 240, each run executing with the same combined number set 290, regenerated by PRNGs 152-155 with seeds 252-255. In an example, service 240 may be a simulation program (e.g., a Monte Carlo simulation, K-means clustering simulation, bootleg simulation, etc.).

The first seed value is assigned to a first PRNG of the plurality of PRNGs and the second seed value to a second PRNG of the plurality of PRNGs (block 320). In an example, seed engine 142 assigns seed 252 to PRNG 152 and seed 253 to PRNG 153. In an example, PRNG 152 is associated with application 162, PRNG 153 is associated with application 163, PRNG 154 is associated with application 164, and PRNG 155 is associated with application 165. In an example, each instance of service 240 (e.g., applications 162-165) receives a respective data shard 232-235 of a collection of data to process in conjunction with a respective PRN set 272-275, including application 162 processing data shard 232 with PRN set 272.

A first pseudorandom number set is received from the first PRNG and a second pseudorandom number set from the second PRNG (block 330). In an example, randomization engine 140 assembles combined number set 290 from a plurality of PRN sets 272-275 generated by PRNGs 152-155 by receiving the outputs of PRNGs 152-155. In an example, PRNGs 152-155 send completed PRN sets 272-275 to randomization engine 140 after each PRN set 272-275 is completely generated, for example, for archival purposes. In an example, for a scientific study, the PRNs used for the study may be scrutinized with tests for randomness to validate the results of the study. In some examples, depending on the size of combined number set 290, generation speed of PRNs, and other factors, reading the combined number set 290 from storage may be advantageous. However, in many typical scenarios, live regeneration may be preferable performance wise to loading a whole PRN set into memory and reading the PRN set from memory. In an example, a subset of the PRNs (e.g., PRN 262C and 262N) in a given PRN set (e.g., PRN set 272) may be stored for future consistency checks. In another example, PRNGs 152-155 may send individual PRNs (e.g., PRN 292A-N, 293A-N, 294A-N, and 295A-N) as they are generated. In an example, application 162, container 160A, and/or PRNG 152 experiences a failure such as a crash while processing data shard 232. In the example, randomization engine 140 sends seed 252 to an available PRNG (e.g., PRNG 152-155) associated with an available application (e.g., applications 162-165) to reprocess data shard 232 during whose processing the failure occurred. In an example, application 163 processes data shard 233 with PRN set 273 independently of application 162 processing data shard 232 with PRN set 272. In the example, application 163 may process data shard 233 before, after, or during the processing of data shard 232 by application 162.

In an example, data shards 232-235 may be shards of a distributed data set processed in a big data environment. In the example, a data set too large to be processed by an individual node may be divided into batches for processing. In an example, batches may be processed out of order with the results recombined after all batches are done processing. In an example, a given data set may include more shards or batch jobs to process than there are application instances (e.g., applications 162-165) available for processing in system 200. In the example, some of the data shards or batches may be queued to be performed after capacity becomes available. In some cases, one application instance (e.g., application 162) may process through data shards sequentially if no other nodes are available. In an example, the number of PRN sets required to process through a given data set may be correlated with the number of data shards (e.g., data shards 232-235) that the data set is divided into. In an example, each PRN set (e.g., PRN sets 272-275) associated with each data shard (e.g., data shards 232-235) may be generated by one of PRNGs 152-155, however, each of PRNGs 152-155 may regenerate a different PRN set of PRN sets 272-275 on a different run of service 240. In an example with 6 data shards, data shard 234 may have relatively few elements to process and application 164 may first have capacity to process another data shard, so the 5$^{th}$ data shard may be sent by service 240 to application 164 and PRNG 154 may be sent a new fifth seed correlated with the fifth data shard. In an example, data shard 232 includes a first plurality of partitions, each partition of the first plurality of partitions associated with a corresponding PRN (e.g., PRNs 262A-N) of the PRN set 272, data shard 233 includes a second plurality of partitions, each partition of the second plurality of partitions associated with a corresponding PRN (e.g., PRNs 263A-N) of the PRN set 273, and the first plurality of partitions includes a different quantity of partitions from the second plurality of partitions (e.g., 14 partitions vs. 8 partitions).

A plurality of pseudorandom number sets from the plurality of PRNGs is combined into a combined number set (block 340). In an example, randomization engine 140 combines PRN sets 272-275 into combined number set 290. In an example, PRNGs 152-155 execute in parallel to generate combined number set 290 simultaneously. In an example, four PRNGs 152-155 executing in parallel may generate combined number set 290 approximately times faster than one PRNG 152 executing alone to generate combined number set 290. In an example, PRNGs 152-155 may execute asynchronously to generate PRN sets 272-275. For example, PRNG 152 may begin execution first due to receiving instructions first and seed 252. In the example, PRNG 153 which receives seed 253 second may complete execution last, for example, due to delays from application 163. In an example, PRNG 153 may wait for an unrelated program on container 160B to complete execution before generating PRN set 273. In an example, since randomization engine 140 is aware of each of seeds 252-255, each PRN of combined number set 290 (e.g., PRNs 292A-N, 293A-N, 294A-N, and 295A-N) may be identifiable as an $x^{th}$ PRN of the $y^{th}$ PRNG (e.g., PRNGs 152-155). In an example, each of PRNGs 152-155 may add PRNs to PRN sets 272-275, and randomization engine 140 may still be able to keep combined number set 290 in order. For example, a $15^{th}$ PRN generated by PRNG 152 may still be added to PRN set 272 and will be added to combined number set 290 before PR 293A because the first PRN of PRNG 153 may always be set to a position after the last PRN of PRN set 272.

Figure 4:
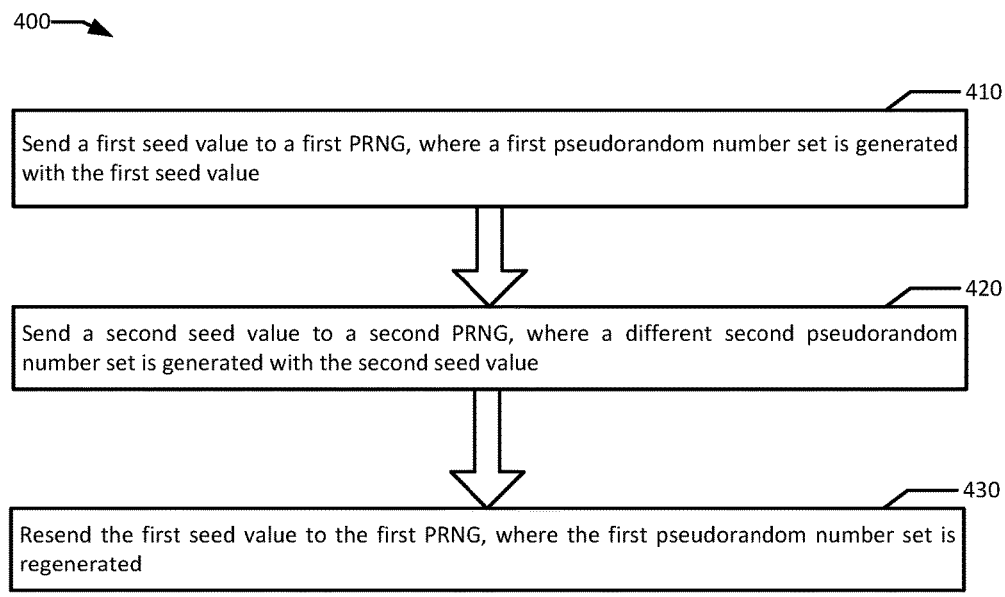
FIG. 4 is a flowchart illustrating an example of repeatable distributed pseudorandom number generation according to an example of the present disclosure.

FIG. 4 is a flowchart illustrating an example of repeatable distributed pseudorandom number generation according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a randomization engine 140.

Example method 400 may begin with sending a first seed value to a first PRNG, where the first PRNG generates a first pseudorandom number set with the first seed value (block 410). In an example, randomization engine 140 sends seed 252 to PRNG 152 which generates PRN set 272, for example, with 14 PRNs (e.g., PRN 292A-292N). A second seed value is sent to a second PRNG, where the second PRNG generates a second pseudorandom number set with the second seed value and the second pseudorandom number set includes a different quantity of numbers from the first pseudorandom number set (block 420). In an example, seed engine 142 sends seed 253 to PRNG 153 which generates PRN set 273 with 8 PRNs (e.g., PRNs 293A-G and 293N). In an example, seed 252 and 253 are included in of a plurality of seed values (seeds 252-255) generated and output by seed engine 142, and a combined number set 290 is formed by combining each of PRN sets 272-275 generated by PRNGs 152-155 based on seeds 252-255. In an example, seeds 252-255 are stored in seed value store 144 and combined number set 290 is reproduced by re-inputting each of seeds 252-255 into a PRNG (e.g., PRNGs 152-155). In an example, a different PRNG-seed combination may be selected for regeneration and the same combined number set 290 is obtained so long as the PRN sets 272-275 may be identified by the seed (e.g., seeds 252-255) used to generate the respective PRN set 272-275.

In an example service 240 requests combined number set 290, which is input into service 240. In an example, combined number set 290 may be generated and sent to service 240 as a completed input where a known quantity of PRNs is necessary. In another example, a PRNG associated with each respective processing application instance (e.g., applications 162-165) of service 240 may be seeded with seeds 252-255 to allow dynamic generation of PRNs in a repeatable and reconstitutable manner. In an example, PRNG 152 is associated with application 162, and PRGN 153 with application 163. In the example, a failure of application 162, PRNG 152, container 160A, and/or VM 112 may require a reprocessing of all or part of data shard 232. In the example, if shard results 282 are affected by the crash, data shard 232 may be reprocessed completely with PRNG 152 reinitialized with seed 252. In another example, part of the results of data shard 232 may be saved in an incomplete shard results 282 by application 162. In the example, PRNG 152 may be reseeded upon restart by seed 252 and "fast-forwarded" to the correct position based, for example, on a count of how many partitions of data shard 232 have been processed (e.g., how many PRNs of PRN set 272 have already been used). In an example, a recovery run of application 162 may be performed by a different instance of service 240, for example, applications 163-165.

In an example, service 240 is run repeatedly to test changes to an output (e.g., result set 280) of service 240 based on configurable variables of service 240, each run executing with the same combined number set 290, regenerated by the plurality of PRNGs with the plurality of seed values. In an example, subsequent data sets may be sharded into more or less partitions than the first execution of service 240 (e.g., reflecting on a different sized input pool of data), and randomness may still be controlled for by re-seeding each run with seeds 252-255, because each subsequent run of service 240 will use the same PRN sets 272-275 as the then current run with the most PRNs generated for each of PRN sets 272-275. For example, if PRNG 152 generates PRN Sset 272 with 14 PRNs on the first run, and then needs only 8 PRNs on a second run, each of the first 8 PRNs in the second run would match the first 8 PRNs of the first run. A subsequent third run with 18 PRNs requested would share the first 14 PRNs with PRN set 272. In an example, PRN sets 272-275 are inputs into applications 162-165 processing data shards 232-235. In an example, application 163 and PRNG 153 may execute during an overlapping time frame with application 162 and PRNG 152.

The first seed value to the first PRNG is resent, where the first PRNG regenerates the first pseudorandom number set (block 430). In an example, seed 252 is resent to PRNG 152 in conjunction with a failure by PRNG 152, application 162, and/or container 160A. In the example, a partial or full regeneration of PRN set 272 is required. In another example, seed 252 is resent to PRN Set 272 in relation to application 162 receiving a new data shard to process for a new run of service 240, for example, to test an updated simulation hypothesis.

Figure 5:
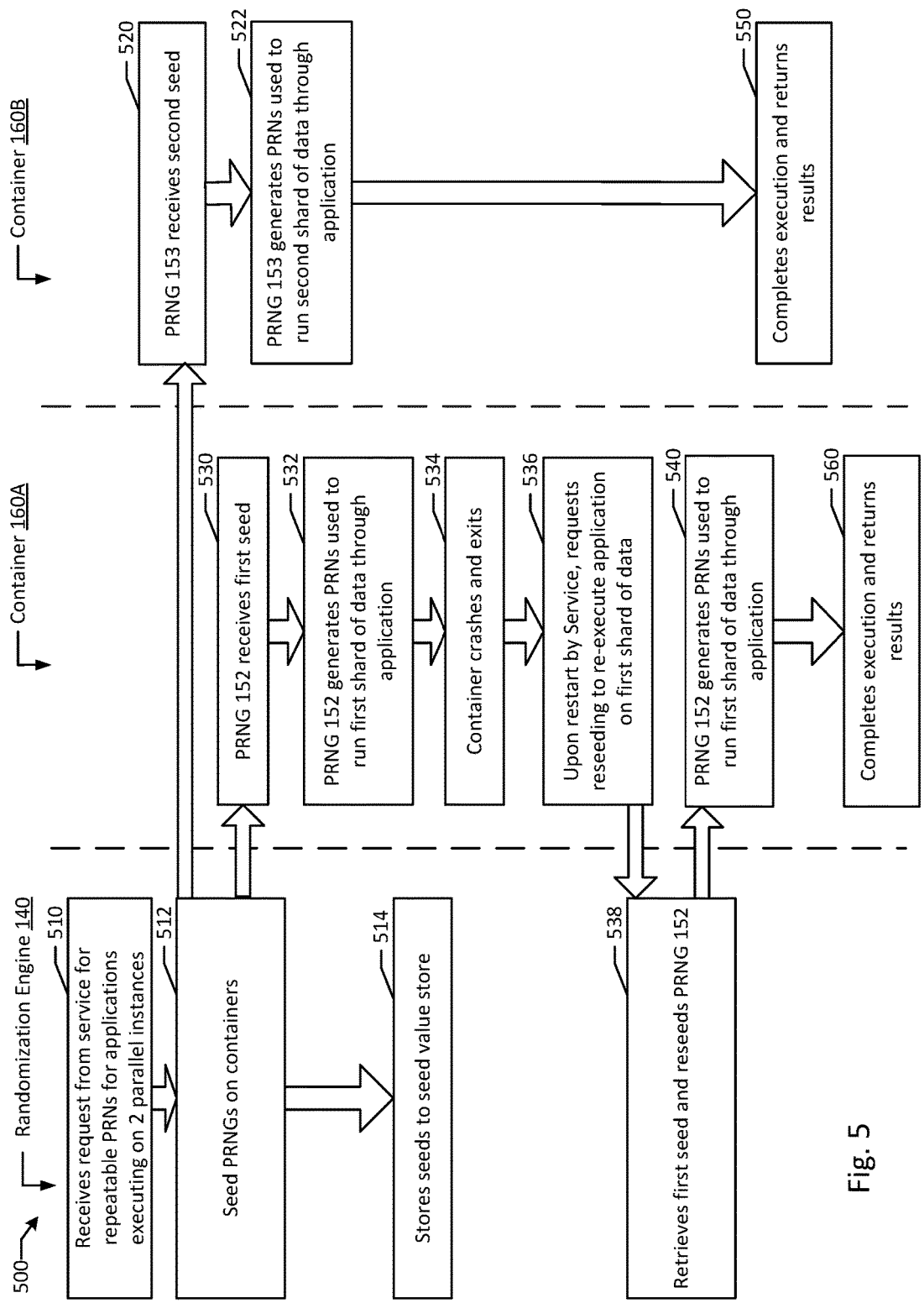
FIG. 5 is flow diagram of an example of repeatable distributed pseudorandom number generation according to an example of the present disclosure.

FIG. 5 is flow diagram of an example of repeatable distributed pseudorandom number generation according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, randomization engine 140 coordinates containers 160A and 160B to process shards of a same data set in parallel with repeatable PRNs.

In example system 500, randomization engine 140 receives a request from service 240 for repeatable PRNs for applications 162-163 executing on two parallel instances (block 510). In an example, randomization engine 140 seeds PRNG 152 on container 160A and PRNG 153 on container 160B (block 512). In the example, seed engine 142 stores seeds 252 and 253 to seed value store 144 (block 514). In an example, PRNG 143 on container 160B receives seed 253 (block 520). In the example, PRNG 153 generates PRN set 273 used to run data shard 233 through application 163 (block 522). In an example, PRNG 152 receives seed 252 (block 530). In the example, PRNG 152 generates PRN set 272 used to run data shard 232 through application 162 (block 532). In an example, container 160A unexpectedly crashes and exits (block 534). In the example, upon restart of application 162 by service 240 either on a relaunched container 160A or a different container, service 240 requests reseeding of associated PRNG 152 to re-execute application 162 on data shard 232 (block 536). In an example, PRNG 152 may be a component part of application 162 or a component part of container 160A. In an example, PRNG may be included in a function and/or shared library accessed by application 162. In an example, randomization engine 140 retrieves seed 252 and reseeds PRNG 152 (block 538). In an example, PRNG 152 generates PRN set 272 to run data shard 232 through application 162 (block 540). In an example, during the execution of the reseeded run of application 162, application 163 completes execution on data shard 233 and returns shard results 283 to service 240 (block 550). In an example, on the rerun application 162 completes execution and returns shard results 282 (block 560).

In an example, service 240 may be a K-means clustering simulation, executed for example by a franchise chain to determine the best locations for opening ten new coffee shops in an expansion territory. In the example, the franchise chain may be attempting to locate each shop to minimize the distance for any given resident of the expansion city to go to a shop. Two main variable inputs to the simulation are the physical locations of each member of the population of the city and the starting locations for the K-means testing for each test run. In an example, a first randomization may be executed to distribute the population of the city based on known density data (e.g., from sampling or surveying). For example, in a city of 1 million people, a survey may be conducted of 1000 people for their street block generating a probability chart of the population density on each block. This density chart may then be used to distribute the whole population of 1 million proportionately. Of these 1 million data points, 10 are then selected (e.g., at random) as the starting points from which to calculate local optimum store locations. The ten random locations may then be iteratively updated to minimize distance to one of the ten locations from each of the 1 million residents. For example, a sector of the city is allocated to each of the ten locations based on residents for whom that location is the closest. The ten locations are then centered within the regions they cover and the distance checks may be run again until the ten locations no longer move, thereby finding local maximums for locations. In an example, either the ten starting locations or the distribution of the 1 million residents may be controlled for through multiple iterations of simulation through repeatable distributed random number generation thereby reducing the number of simulation runs necessary to discover significant trends resulting from manipulating the other variable.

Figure 6:
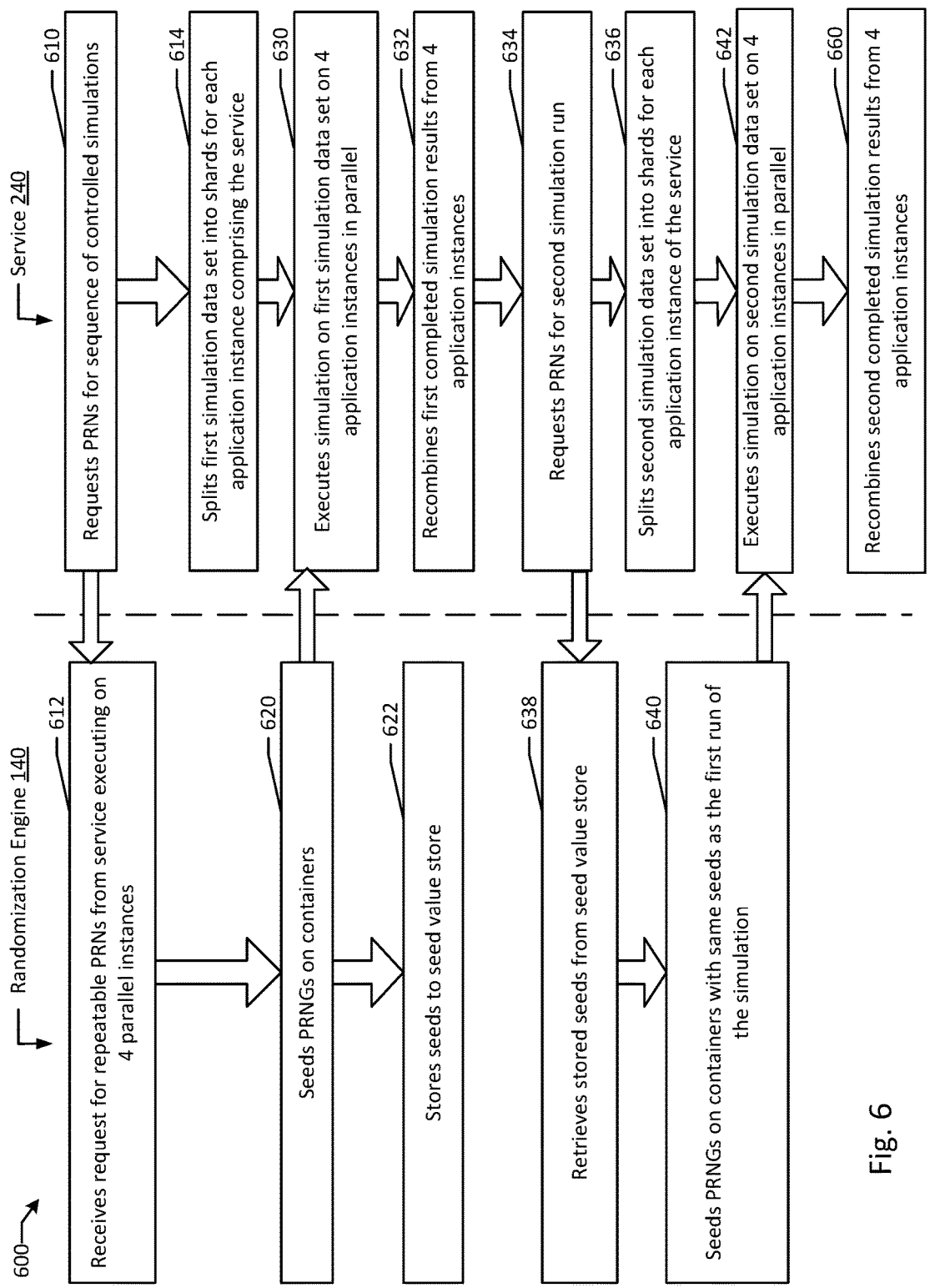
FIG. 6 is a flow diagram of an example of repeatable simulations with repeatable distributed pseudorandom number generation according to an example of the present disclosure.

FIG. 6 is a flow diagram of an example of repeatable simulations with repeatable distributed pseudorandom number generation according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, randomization engine 140 and service 240 combine to repeat a simulation with updated variables.

In example system 600, service 240 requests PRNs for a sequence of controlled simulations executed by applications 162-165 (block 610). For example, service 240 may be a Monte Carlo simulation service executed by a cellular phone network to stress test their cellular network under high load for a metropolitan area. In the example, PRNs generated will simulate individual users and the behaviors of those users. In an example, because user behavior is not uniformly distributed, outputs from PRNs may be mapped or sampled into a distribution conforming with the gathered statistical user behavior data. In an example, randomization engine 140 receives a request for repeatable PRNs from service 240 (block 612). In the example, service 240 splits a simulation data set into data shards 232-235 sent respectively to applications 162-165 (block 614). For example, the sharded data set may include current cell phone tower distributions and specifications along with proposed new tower locations and probability data related to user behaviors on the network. In an example, randomization engine 140, specifically seed engine 142 sends seeds 252-255 to PRNGs 152-155 on containers 160A-D (block 620). In the example, for repeatability, seeds 252-255 are stored in seed value store 144 (block 622). In an example, service 240 executes the first simulation run on applications 162-165 in parallel for increased performance (block 630). In the example, PRN sets 272-275 are used to simulate users based on the probability data for user behavior included in data shards 232-235. In an example, service 240 recombines the first completed simulation results from applications 162-165 as result set 280 (block 632).

In an example, service 240 is configured for multiple executions to test various proposed placements of new cell phone towers and requests a second simulation run (block 634). In an example, service 240 again splits up the new simulation data set with new tower placements into new shards to be processed by applications 162-165 which are execution instances of service 240 (block 636). In the example, randomization engine 140 retrieves seeds 252-255 from seed value store 144 (block 638). In the example, randomization engine 140 sends seeds 252-255 to PRNGs 152-155 on containers 160A-D again (block 640). In an example, controlling for user behavior between the first two tests isolates the test to testing cell phone tower placement rather than factoring in a potentially different set of user behaviors. In an example service 240 executes the section simulation on the second data set on applications 162-165 (block 642). In the example, service 240 recombines the second completed simulation results from each of applications 162-165 into a new result set (block 660). In an example, applications 162-165 may be configured for stream processing, potentially leveraging GPUs and special registers such as floating point registers for increased performance in repetitively executing a given calculation. In the example, when processing a fixed data set into a new output that does not replace the input, stream processing may offer significant performance enhancements. In an example, after multiple iterations with the same simulated user base, the same set of tests for cell tower positions may be rerun with a new set of seeds for PRNGs 152-155 simulating, for example, a different day with different usage patterns.

Figure 7:
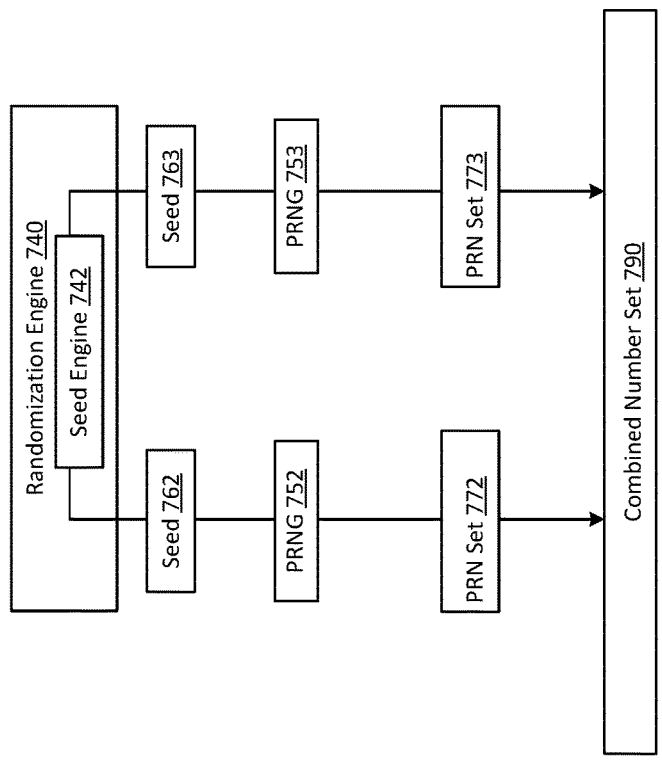
FIG. 7 is a block diagram of an example distributed pseudorandom number generation system according to an example of the present disclosure.

FIG. 7 is a block diagram of an example distributed pseudorandom number generation system according to an example of the present disclosure. Example system 700 includes PRNGs 752 and 753 and randomization engine 740 including seed engine 742, randomization engine 740 configured to control PRNGs 752 and 753 by executing to generate seeds 762 and 763. In an example, a quantity of seeds 762 and 763 is equal to the quantity of PRNGs 752 and 753. Seed 762 is assigned to PRNG 752 and seed 763 is assigned to PRNG 753. PRN set 772 is received from PRNG 752 and PRN set 773 is received from PRNG 753. PRN sets 772 and 773 from PRNGs 752 and 753 are combined into combined number set 790.

Figures 8A, 8B:
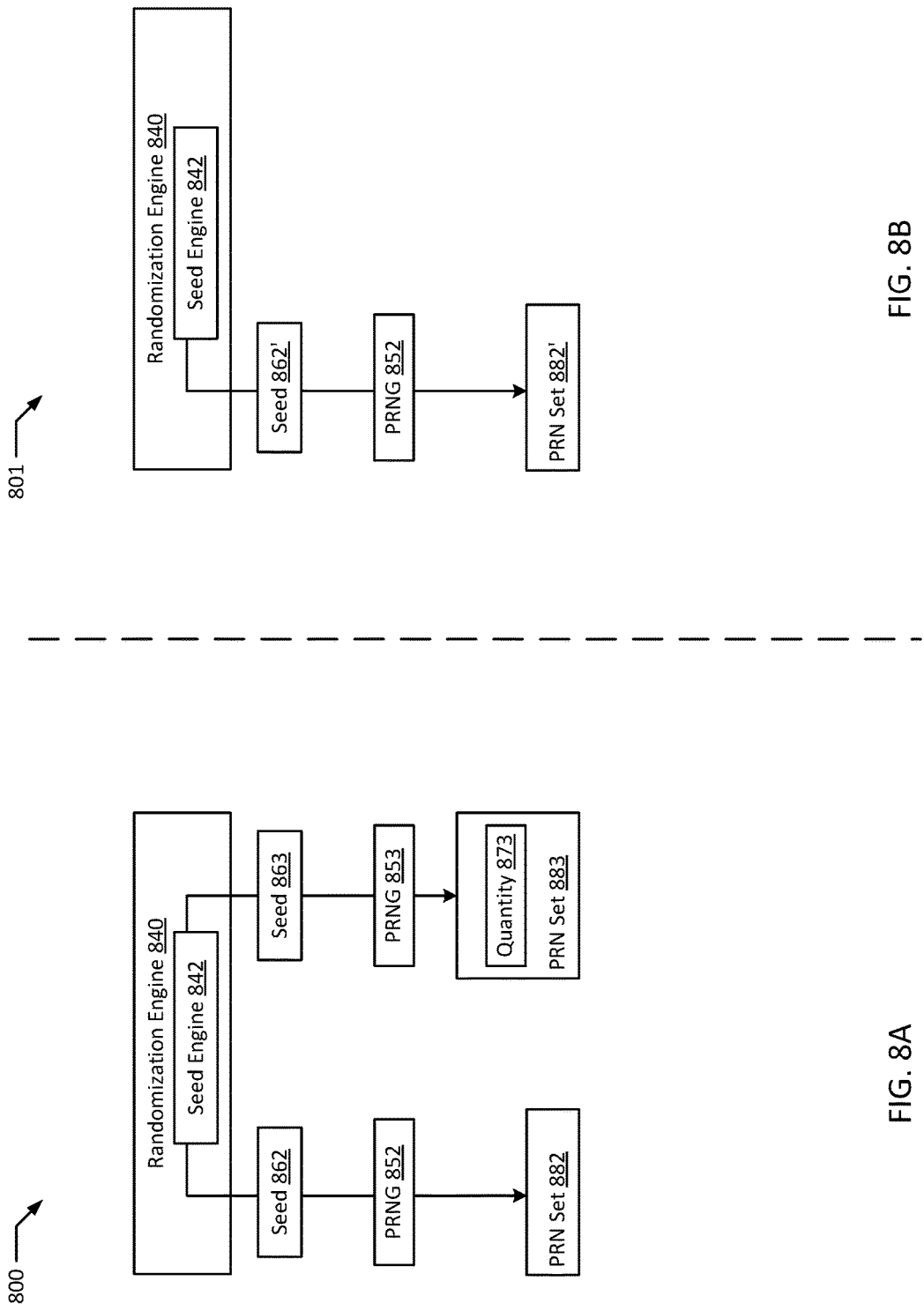
FIGS. 8A-B are block diagrams of a repeatable distributed pseudorandom number generation system according to an example of the present disclosure.

FIGS. 8A-B are block diagrams of a repeatable distributed pseudorandom number generation system according to an example of the present disclosure. Example system 800 includes PRNGs 852 and 853 and randomization engine 840 including seed engine 842, randomization engine 840 configured to control PRNGs 852 and 853 by executing to send seed 862 PRNG 852, where PRNG 852 generates PRN set 882 with seed 862. Sending seed 863 to PRNG 853, where PRNG 853 PRN set with seed 863 and PRN set 883 includes a different quantity 873 of numbers from PRN set 882. Example system 801 is a later point in time in example system 800, when seed 862 is resent to PRNG 852 as seed 862', where PRNG 852 regenerates PRN set 882 as PRN set 882'.

In an example, repeatable distributed pseudorandom number generation allows for repeatable generation of reliable PRNs while also allowing for such generation to occur on distributed systems. By removing a sequential limitation imposed on simulation programs by their associated PRNG, significant performance improvements may result due to the removal of a potential execution bottleneck. System utilization is therefore also significantly increased during the execution of the simulator because CPUs that would otherwise sit idle waiting for a sequential processing step may process data simultaneously. In addition, PRNGs may execute dozens of times faster (e.g., on hosts with dozens of processors). Granular repeatability for individual distributed nodes also enables a "fire and forget" type of workload allocation as any instances that fail to respond with results may be re-executed with confidence. In an example, for higher confidence of execution without waiting for failures, each shard of a processing task may also be replicated among two or more nodes for live redundancy. While typical PRNs are already "fast" their sequential nature (e.g., due to requirements for generating results that are not seekable), may impose limitations on the architecture of related components. Through overcoming these hardware constraints, repeatable distributed pseudorandom number generation allows for higher throughput, utilization, and efficiency of compute resources on a data center wide level.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a plurality of PRNGs including a first PRNG and a second PRNG; and a randomization engine including a seed engine, the randomization engine configured to control the plurality of PRNGs by executing to: generate a plurality of seed values, including a first seed value and a second seed value, wherein the plurality of seed values is equal in quantity to the plurality of PRNGs; assign the first seed value to the first PRNG and the second seed value to the second PRNG; receive a first pseudorandom number set from the first PRNG and a second pseudorandom number set from the second PRNG; and combine a plurality of pseudorandom number sets from the plurality of PRNGs into a combined number set.

In accordance with a 2nd exemplary aspect of the present disclosure, which may be used in combination with any one or more of the preceding aspects (e.g., the 1st aspect), wherein the plurality of seed values is stored to persistent storage and the combined number set is reproduced by re-inputting the plurality of seed values into the plurality of PRNGs. In accordance with a 3rd exemplary aspect of the present disclosure, which may be used in combination with any one or more of the preceding aspects (e.g., the 1st aspect), wherein the combined number set is requested by an application capable of distributed execution and the combined number set is an input into the application. In accordance with a 4th exemplary aspect of the present disclosure, which may be used in combination with any one or more of the preceding aspects (e.g., the 3rd aspect), wherein the application is run repeatedly to test changes to an output of the application based on configurable variables of the application, each run executing with the same combined number set, regenerated by the plurality of PRNGs with the plurality of seed values. In accordance with a 5th exemplary aspect of the present disclosure, which may be used in combination with any one or more of the preceding aspects (e.g., the 3rd aspect), wherein each of the plurality of PRNGs is associated with a respective instance of the application, including a first instance of the application with the first PRNG and a second instance of the application with the second PRNG. In accordance with a 6th exemplary aspect of the present disclosure, which may be used in combination with any one or more of the preceding aspects (e.g., the 5th aspect), wherein each instance of a plurality of instances of the application receives a respective shard of a collection of data to process in conjunction with a respective pseudorandom number set, including a first instance of the application processing a first shard of the collection of data with the first pseudorandom number set. In accordance with a 7th exemplary aspect of the present disclosure, which may be used in combination with any one or more of the preceding aspects (e.g., the 6th aspect), wherein a failure of the first instance of the application results in the sending of the first seed value to a selected PRNG, in relation with reprocessing the first shard of the collection of data. In accordance with a 8th exemplary aspect of the present disclosure, which may be used in combination with any one or more of the preceding aspects (e.g., the 6th aspect), wherein a second instance of the application processes a second shard of the collection of data with the second pseudorandom number set while the first instance of the application is processing the first shard of the collection of data. In accordance with a 9th exemplary aspect of the present disclosure, which may be used in combination with any one or more of the preceding aspects (e.g., the 6th aspect), wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions. In accordance with a 10th exemplary aspect of the present disclosure, which may be used in combination with any one or more of the preceding aspects (e.g., the 1st aspect), wherein the first PRNG, the second PRNG, a third PRNG, and a fourth PRNG execute in parallel to generate the combined number set.

Aspects of the subject matter described herein may be useful alone or in combination with one or more other aspects described herein. In a 11th exemplary aspect of the present disclosure, a method comprises: generating a plurality of seed values, including a first seed value and a second seed value, wherein the plurality of seed values is equal in quantity to a plurality of PRNGs; assigning the first seed value to a first PRNG of the plurality of PRNGs and the second seed value to a second PRNG of the plurality of PRNGs; receiving a first pseudorandom number set from the first PRNG and a second pseudorandom number set from the second PRNG; and combining a plurality of pseudorandom number sets from the plurality of PRNGs into a combined number set.

In accordance with a 12th exemplary aspect of the present disclosure, which may be used in combination with any one or more of the preceding aspects (e.g., the 11th aspect), wherein the plurality of seed values is stored to persistent storage and the combined number set is reproduced by re-inputting the plurality of seed values into the plurality of PRNGs. In accordance with a 13th exemplary aspect of the present disclosure, which may be used in combination with any one or more of the preceding aspects (e.g., the 11th aspect), wherein the combined number set is requested by an application capable of distributed execution and the combined number set is an input into the application. In accordance with a 14th exemplary aspect of the present disclosure, which may be used in combination with any one or more of the preceding aspects (e.g., the 13th aspect), wherein the application is run repeatedly to test changes to an output of the application based on configurable variables of the application, each run executing with the same combined number set, regenerated by the plurality of PRNGs with the plurality of seed values. In accordance with a 15th exemplary aspect of the present disclosure, which may be used in combination with any one or more of the preceding aspects (e.g., the 13th aspect), wherein each of the plurality of PRNGs is associated with a respective instance of the application, including a first instance of the application with the first PRNG and a second instance of the application with the second PRNG, and each instance of a plurality of instances of the application receives a respective shard of a collection of data to process in conjunction with a respective pseudorandom number set, including a first instance of the application processing a first shard of the collection of data with the first pseudorandom number set. In accordance with a 16th exemplary aspect of the present disclosure, which may be used in combination with any one or more of the preceding aspects (e.g., the 15th aspect), wherein a failure of the first instance of the application results in the sending of the first seed value to a selected PRNG, in relation with reprocessing the first shard of the collection of data. In accordance with a 17th exemplary aspect of the present disclosure, which may be used in combination with any one or more of the preceding aspects (e.g., the 15th aspect), wherein a second instance of the application processes a second shard of the collection of data with the second pseudorandom number set while the first instance of the application is processing the first shard of the collection of data. In accordance with a 18th exemplary aspect of the present disclosure, which may be used in combination with any one or more of the preceding aspects (e.g., the 15th aspect), wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions.

Aspects of the subject matter described herein may be useful alone or in combination with one or more other aspects described herein. In a 19th exemplary aspect of the present disclosure, a computer-readable non-transitory storage medium stores executable instructions, which when executed by a computer system, cause the computer system to: generate a plurality of seed values, including a first seed value and a second seed value, wherein the plurality of seed values is equal in quantity to a plurality of PRNGs; assign the first seed value to a first PRNG of the plurality of PRNGs and the second seed value to a second PRNG of the plurality of PRNGs; receive a first pseudorandom number set from the first PRNG and a second pseudorandom number set from the second PRNG; and combine a plurality of pseudorandom number sets from the plurality of PRNGs into a combined number set.

Aspects of the subject matter described herein may be useful alone or in combination with one or more other aspects described herein. In a 20th exemplary aspect of the present disclosure, a system comprises: a means for generating a plurality of seed values, including a first seed value and a second seed value, wherein the plurality of seed values is equal in quantity to a plurality of PRNGs; a means for assigning the first seed value to a first PRNG of the plurality of PRNGs and the second seed value to a second PRNG of the plurality of PRNGs; a means for receiving a first pseudorandom number set from the first PRNG and a second pseudorandom number set from the second PRNG; and a means for combining a plurality of pseudorandom number sets from the plurality of PRNGs into a combined number set.

Aspects of the subject matter described herein may be useful alone or in combination with one or more other aspects described herein. In a 21st exemplary aspect of the present disclosure, a system comprises: a plurality of PRNGs including a first PRNG and a second PRNG; and a randomization engine including a seed engine, the randomization engine configured to control the plurality of PRNGs by executing to: send a first seed value to the first PRNG, wherein the first PRNG generates a first pseudorandom number set with the first seed value; send a second seed value to the second PRNG, wherein the second PRNG generates a second pseudorandom number set with the second seed value and the second pseudorandom number set includes a different quantity of numbers from the first pseudorandom number set; and resend the first seed value to the first PRNG, wherein the first PRNG regenerates the first pseudorandom number set.

In accordance with a 22nd exemplary aspect of the present disclosure, which may be used in combination with any one or more of the preceding aspects (e.g., the 21st aspect), wherein the first seed value and the second seed value are included in of a plurality of seed values generated and output by the seed engine, and a combined number set is formed by combining each pseudorandom number set including the first pseudorandom number set and the second pseudorandom number set generated by each of the plurality of PRNGs based on a respective seed value of the plurality of seed values. In accordance with a 23rd exemplary aspect of the present disclosure, which may be used in combination with any one or more of the preceding aspects (e.g., the 22nd aspect), wherein the plurality of seed values is stored to persistent storage and the combined number set is reproduced by re-inputting the plurality of seed values into the plurality of PRNGs. In accordance with a 24th exemplary aspect of the present disclosure, which may be used in combination with any one or more of the preceding aspects (e.g., the 22nd aspect), wherein the combined number set is requested by an application capable of distributed execution and the combined number set is an input into the application. In accordance with a 25th exemplary aspect of the present disclosure, which may be used in combination with any one or more of the preceding aspects (e.g., the 24th aspect), wherein each of the plurality of PRNGs is associated with a respective instance of the application, including a first instance of the application with the first PRNG and a second instance of the application with the second PRNG. In accordance with a 26th exemplary aspect of the present disclosure, which may be used in combination with any one or more of the preceding aspects (e.g., the 25th aspect), wherein a failure of the first instance of the application results in the resending of the first seed value to the first PRNG in relation with a recovery run of the first instance of the application. In accordance with a 27th exemplary aspect of the present disclosure, which may be used in combination with any one or more of the preceding aspects (e.g., the 24th aspect), wherein the application is run repeatedly to test changes to an output of the application based on configurable variables of the application, each run executing with the same combined number set, regenerated by the plurality of PRNGs with the plurality of seed values. In accordance with a 28th exemplary aspect of the present disclosure, which may be used in combination with any one or more of the preceding aspects (e.g., the 24th aspect), wherein each instance of a plurality of instances of the application receives a respective shard of a collection of data to process in conjunction with a respective pseudorandom number set, including a first instance of the application processing a first shard of the collection of data with the first pseudorandom number set. In accordance with a 29th exemplary aspect of the present disclosure, which may be used in combination with any one or more of the preceding aspects (e.g., the 28th aspect), wherein a second instance of the application processes a second shard of the collection of data with the second pseudorandom number set while the first instance of the application is processing the first shard of the collection of data. In accordance with a 30th exemplary aspect of the present disclosure, which may be used in combination with any one or more of the preceding aspects (e.g., the 29th aspect), wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions.

Aspects of the subject matter described herein may be useful alone or in combination with one or more other aspects described herein. In a 31st exemplary aspect of the present disclosure, a method comprises: sending a first seed value to a first PRNG, wherein the first PRNG generates a first pseudorandom number set with the first seed value; sending a second seed value to a second PRNG, wherein the second PRNG generates a second pseudorandom number set with the second seed value and the second pseudorandom number set includes a different quantity of numbers from the first pseudorandom number set; and resending, the first seed value to the first PRNG, wherein the first PRNG regenerates the first pseudorandom number set.

In accordance with a 32nd exemplary aspect of the present disclosure, which may be used in combination with any one or more of the preceding aspects (e.g., the 31st aspect), wherein the first seed value and the second seed value are included in of a plurality of seed values generated and output by the seed engine, and a combined number set is formed by combining each pseudorandom number set including the first pseudorandom number set and the second pseudorandom number set generated by each of the plurality of PRNGs based on a respective seed value of the plurality of seed values. In accordance with a 33rd exemplary aspect of the present disclosure, which may be used in combination with any one or more of the preceding aspects (e.g., the 32nd aspect), wherein the plurality of seed values is stored to persistent storage and the combined number set is reproduced by re-inputting the plurality of seed values into the plurality of PRNGs. In accordance with a 34th exemplary aspect of the present disclosure, which may be used in combination with any one or more of the preceding aspects (e.g., the 3nd aspect), wherein the combined number set is requested by an application capable of distributed execution and the combined number set is an input into the application. In accordance with a 35th exemplary aspect of the present disclosure, which may be used in combination with any one or more of the preceding aspects (e.g., the 24th aspect), wherein each of the plurality of PRNGs is associated with a respective instance of the application, including a first instance of the application with the first PRNG and a second instance of the application with the second PRNG. In accordance with a 36th exemplary aspect of the present disclosure, which may be used in combination with any one or more of the preceding aspects (e.g., the 35th aspect), wherein a failure of the first instance of the application results in the resending of the first seed value to the first PRNG in relation with a recovery run of the first instance of the application. In accordance with a 37th exemplary aspect of the present disclosure, which may be used in combination with any one or more of the preceding aspects (e.g., the 34th aspect), wherein the application is run repeatedly to test changes to an output of the application based on configurable variables of the application, each run executing with the same combined number set, regenerated by the plurality of PRNGs with the plurality of seed values. In accordance with a 38th exemplary aspect of the present disclosure, which may be used in combination with any one or more of the preceding aspects (e.g., the 34th aspect), wherein each instance of a plurality of instances of the application receives a respective shard of a collection of data to process in conjunction with a respective pseudorandom number set, including a first instance of the application processing a first shard of the collection of data with the first pseudorandom number set. In accordance with a 39th exemplary aspect of the present disclosure, which may be used in combination with any one or more of the preceding aspects (e.g., the 38th aspect), wherein a second instance of the application processes a second shard of the collection of data with the second pseudorandom number set while the first instance of the application is processing the first shard of the collection of data. In accordance with a 40th exemplary aspect of the present disclosure, which may be used in combination with any one or more of the preceding aspects (e.g., the 39th aspect), wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions.

Aspects of the subject matter described herein may be useful alone or in combination with one or more other aspects described herein. In a 41st exemplary aspect of the present disclosure, a computer-readable non-transitory storage medium storing executable instructions, which when executed by a computer system, cause the computer system to: send a first seed value to a first PRNG, wherein the first PRNG generates a first pseudorandom number set with the first seed value; send a second seed value to a second PRNG, wherein the second PRNG generates a second pseudorandom number set with the second seed value and the second pseudorandom number set includes a different quantity of numbers from the first pseudorandom number set; and resend, the first seed value to the first PRNG, wherein the first PRNG regenerates the first pseudorandom number set.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of PRNGs including a first PRNG and a second PRNG; and
a randomization engine including a seed engine, the randomization engine configured to control the plurality of PRNGs by executing to:
generate a plurality of seed values, including a first seed value and a second seed value, wherein the plurality of seed values is equal in quantity to the plurality of PRNGs;
assign the first seed value to the first PRNG and the second seed value to the second PRNG;
receive a first pseudorandom number set from the first PRNG and a second pseudorandom number set from the second PRNG; and
combine a plurality of pseudorandom number sets from the plurality of PRNGs into a combined number set.

2. The system of claim 1, wherein the plurality of seed values is stored to persistent storage and the combined number set is reproduced by re-inputting the plurality of seed values into the plurality of PRNGs.

3. The system of claim 1, wherein the combined number set is requested by an application capable of distributed execution and the combined number set is an input into the application.

4. The system of claim 3, wherein the application is run repeatedly to test changes to an output of the application based on configurable variables of the application, each run executing with the same combined number set, regenerated by the plurality of PRNGs with the plurality of seed values.

5. The system of claim 3, wherein each of the plurality of PRNGs is associated with a respective instance of the application, including a first instance of the application with the first PRNG and a second instance of the application with the second PRNG.

6. The system of claim 5, wherein each instance of a plurality of instances of the application receives a respective shard of a collection of data to process in conjunction with a respective pseudorandom number set, including a first instance of the application processing a first shard of the collection of data with the first pseudorandom number set.

7. The system of claim 6, wherein a failure of the first instance of the application results in sending the first seed value to a selected PRNG, in relation with reprocessing the first shard of the collection of data.

8. The system of claim 6, wherein a second instance of the application processes a second shard of the collection of data with the second pseudorandom number set while the first instance of the application is processing the first shard of the collection of data.

9. The system of claim 8, wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions.

10. A method comprising:
generating a plurality of seed values, including a first seed value and a second seed value, wherein the plurality of seed values is equal in quantity to a plurality of PRNGs;
assigning the first seed value to a first PRNG of the plurality of PRNGs and the second seed value to a second PRNG of the plurality of PRNGs;
receiving a first pseudorandom number set from the first PRNG and a second pseudorandom number set from the second PRNG; and combining a plurality of pseudorandom number sets from the plurality of PRNGs into a combined number set.

11. A system comprising:
a plurality of PRNGs including a first PRNG and a second PRNG; and
a randomization engine including a seed engine, the randomization engine configured to control the plurality of PRNGs by executing to:
send a first seed value to the first PRNG, wherein the first PRNG generates a first pseudorandom number set with the first seed value;
send a second seed value to the second PRNG, wherein the second PRNG generates a second pseudorandom number set with the second seed value and the second pseudorandom number set includes a different quantity of numbers from the first pseudorandom number set; and
resend one of the first seed value to the first PRNG and the second seed value to the second PRNG, wherein one of (i) the first PRNG regenerates the first pseudorandom number set and (ii) the second PRNG regenerates the second pseudorandom number set.

12. The system of claim 11, wherein the first seed value and the second seed value are included in of a plurality of seed values generated and output by the seed engine, and a combined number set is formed by combining each pseudorandom number set including the first pseudorandom number set and the second pseudorandom number set generated by each of the plurality of PRNGs based on a respective seed value of the plurality of seed values.

13. The system of claim 12, wherein the plurality of seed values is stored to persistent storage and the combined number set is reproduced by re-inputting the plurality of seed values into the plurality of PRNGs.

14. The system of claim 12, wherein the combined number set is requested by an application capable of distributed execution and the combined number set is an input into the application.

15. The system of claim 14, wherein each of the plurality of PRNGs is associated with a respective instance of the application, including a first instance of the application with the first PRNG and a second instance of the application with the second PRNG.

16. The system of claim 15, wherein a failure of the first instance of the application results in resending the first seed value to the first PRNG in relation with a recovery run of the first instance of the application.

17. The system of claim 14, wherein the application is run repeatedly to test changes to an output of the application based on configurable variables of the application, each run executing with the same combined number set, regenerated by the plurality of PRNGs with the plurality of seed values.

18. The system of claim 14, wherein each instance of a plurality of instances of the application receives a respective shard of a collection of data to process in conjunction with a respective pseudorandom number set, including a first instance of the application processing a first shard of the collection of data with the first pseudorandom number set.

19. The system of claim 18, wherein a second instance of the application processes a second shard of the collection of data with the second pseudorandom number set while the first instance of the application is processing the first shard of the collection of data.

20. The system of claim 19, wherein the first shard includes a first plurality of partitions, each partition of the first plurality of partitions associated with a corresponding pseudorandom number of the first pseudorandom number set, the second shard includes a second plurality of partitions, each partition of the second plurality of partitions associated with a corresponding pseudorandom number of the second pseudorandom number set, and the first plurality of partitions includes a different quantity of partitions from the second plurality of partitions.

* * * * *